Oct. 1, 1968 H. LIST ET AL 3,403,561
PRESSURE-METERING DEVICE
Filed April 28, 1967 3 Sheets-Sheet 1
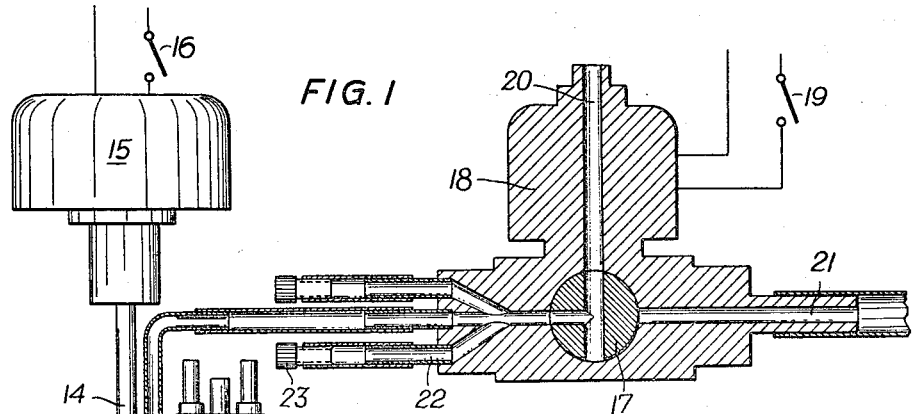
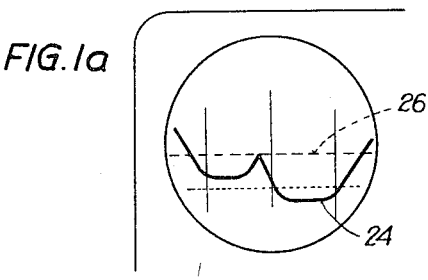
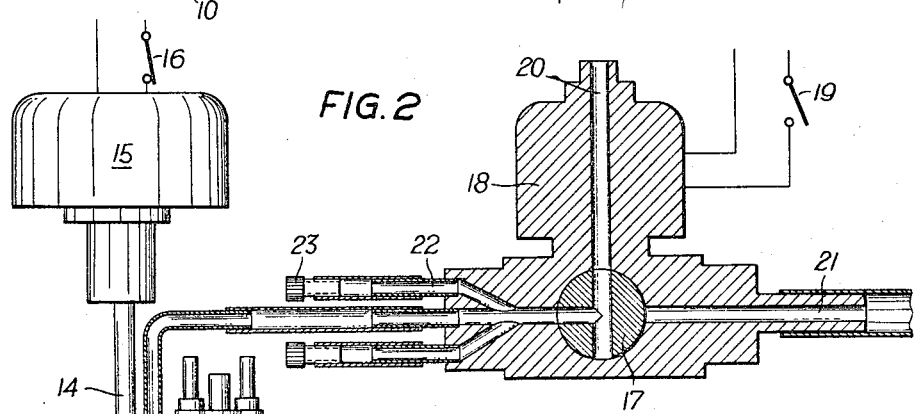
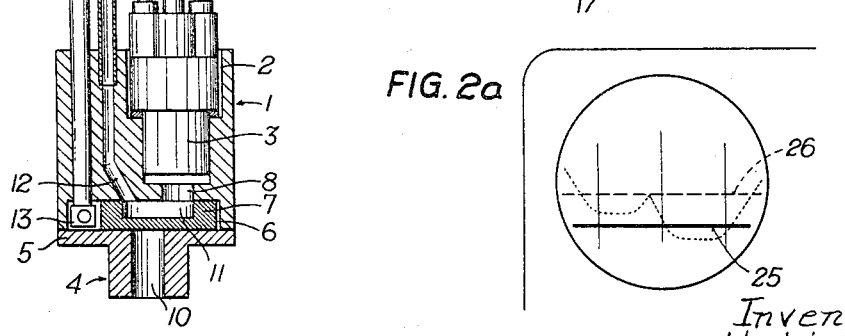
Inventors
H. List
R. Zeiringer
R. Hatschek
By Watson, Cole, Grindle & Watson
Attys.

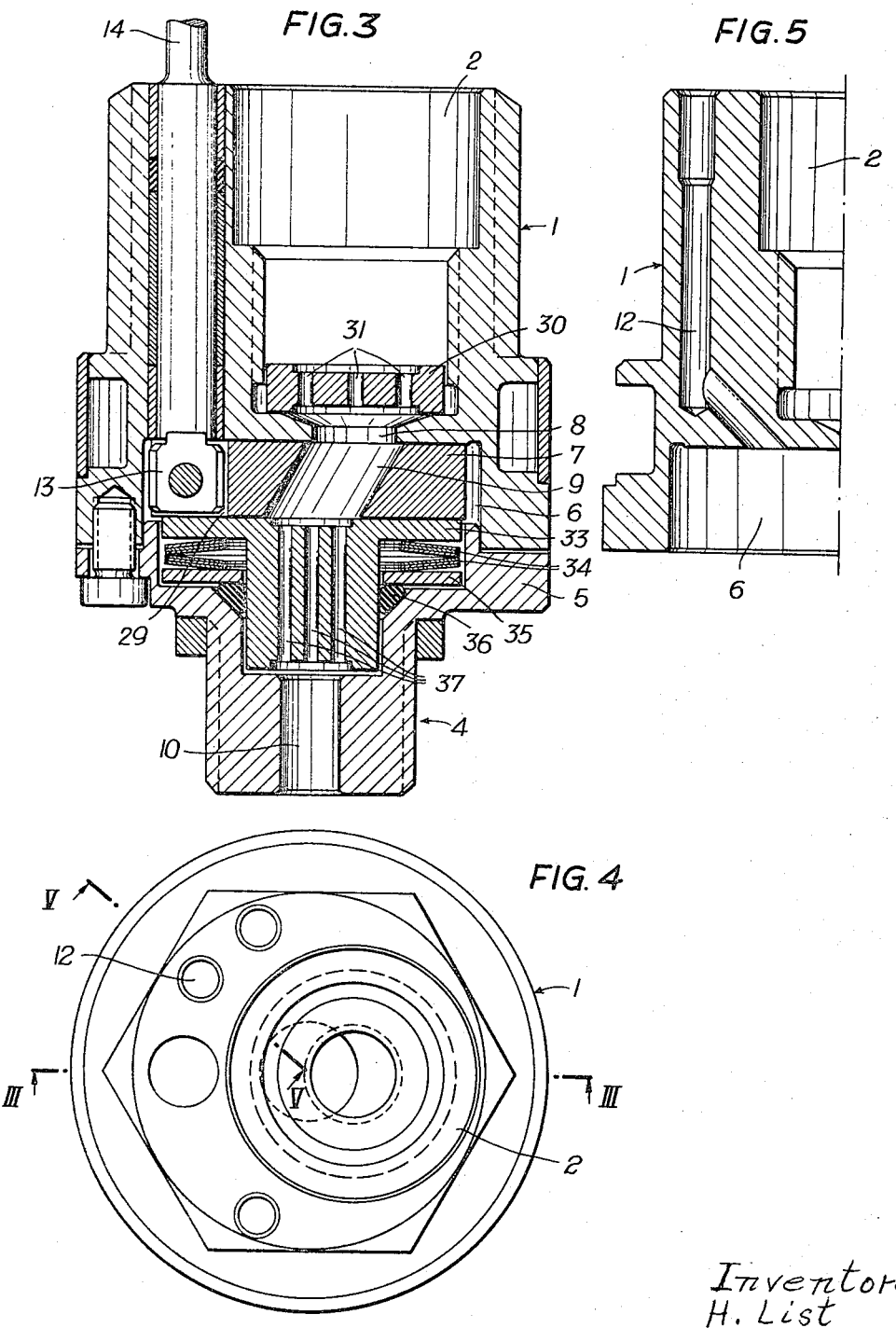

Oct. 1, 1968   H. LIST ET AL   3,403,561

PRESSURE-METERING DEVICE

Filed April 28, 1967   3 Sheets-Sheet 3

Inventors
H. List
R. Zeiringer
R. Hatschek
By Watson Cole Grindle & Watson
Attys.

3,403,561
PRESSURE-METERING DEVICE
Hans List, 126 Heinrichstrasse, Graz, Austria, Rudolf Zeiringer, Graz, Austria, and Rudolf Hatschek, Fribourg, Switzerland; said Zeiringer and said Hatschek assignors to said List
Filed Apr. 28, 1967, Ser. No. 634,626
Claims priority, application Austria, May 3, 1966, A 4,185/66
5 Claims. (Cl. 73—389)

ABSTRACT OF THE DISCLOSURE

A pressure metering device including an adaptor having a chamber for receiving a piezoelectric pressure transducer. In the adaptor is a valve which alternatively provides for communication between the transducer and a conduit connected to a source of reference pressure or the bore of a socket adapted to be connected to a source of pressure to be measured.

---

Figure 8:
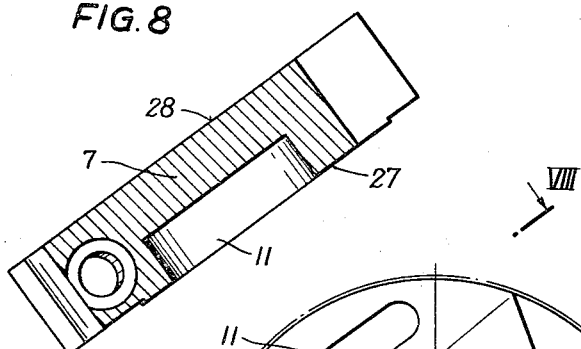

The invention relates to a pressure-metering device comprising a pressure feeler, in particular a piezoelectric measuring transducer and a changeover switch combined with the said pressure-pickup in a single housing and series-connected via a connecting passage, the said changeover switch controlling the connecting passage in a first switch position towards the pressure-measuring point and in a second switch position towards a pressure line subject to a predetermined reference pressure.

With a known device of this type the changeover switch is formed by a valve body freely moving inside a chamber and whose front faces co-operate with one valve seat each, one of the said valve seats being associated with the pressure line subject to the reference pressure and the other with the indicator duct impinged upon by the pressure to be measured. The connecting passage leading to the pressure pickup terminates laterally somewhere between the two valve seat members in the chamber. It is the object of this design to restrict the pressure measuring and/or recording operation to a range above or below the predetermined reference pressure. This restriction aims at the possibility of locating the pressure reading in a distortionless working area of the amplifiers and indicators used for the purpose. However, the known device is objectionable insofar as due to a variety of hardly ascertainable influences the result of the measurements differs uncontrollably from actual pressure conditions. On the one hand, the mass of the valve body and its influences upon the feed motion of the valve is disregarded, and on the other hand the valve body tends to vibrate, particularly in the event of rapid periodic pressure fluctuations, the resulting vibrations jeopardizing the positive closing of the pressurized lines controlled by the valve body.

It is the object of this invention to overcome the shortcomings of the known device on the basis of a fundamentally different departure. The invention provides for a pressure metering device particularly suitable for pressure measurements in internal combustion engines, permitting not only the plotting of a pressure diagram but also the recording of a selective reference pressure. According to the invention, the changeover switch is preferably formed by a remote-controlled sliding switch, the pressure line impinged upon by the reference pressure being connectable via a series-connected, preferably also remote-controlled three-way valve either with the atmosphere or with another pressure source as desired. This design ensures accurate and tight connections for the controlled lines and ducts via accurately defined overflow cross-sectional areas in any switch position of both the changeover switch and of the three-way valve, offering at any moment during the pressure measuring operation the possibility of gating the zero-line corresponding to the atmospheric pressure or any other reference pressure into the diagram. The zero-line and/or a reference pressure can also be gated in direct succession as will be desirable in many instances since the plotting of the oscillogram is thereby greatly facilitated.

Due to the absence of floating components subject to inertia forces, the device according to the invention will not produce faulty results ascribable to the above factors.

According to a preferred embodiment of the invention, the sliding switch presents parallel front faces between which a through overflow channel extends, which in the first switch position is exposed both on the side of the connecting passage and towards the pressure-measuring point, the slide being provided with an open transverse groove on the front end facing the pressure pickup, the said groove registering in the second switch position of the slide both with the connecting passage and with the pressure line. This arrangement offers the advantage of relatively large overflow cross-sections and comparatively short feed motions of the slide. In addition, the slide defined by parallel surfaces can be easily tightened against the walls of the housing.

The operation of the device is furthermore facilitated by the fact that due to the flat design of the slide both the overflow channel and the groove on the slide end facing the pressure pickup can be comparatively short, thereby reducing the pressure-carrying spaces between the pressure pickup and the pressure-carrying system associated therewith. This design prevents the occurrence of vibrations in the area of the pressure-carrying spaces and improves the accuracy of the measuring device.

Particular operational advantages may be derived from a conformation of the device wherein according to the invention the sliding switch is actuated by means of a rotary magnet keeping it in the first switch position when out of circuit, the three-way valve being designed as a solenoid valve keeping the pressure line connected with the atmosphere when out of circuit, both the rotary magnet and the solenoid valve being actuated by means of a common control member. This provides a means for controlling all switch positions of the device from a central location such as from the switchboard of a test bench. Since the switching arrangements generally occurring in actual operation are associated with the dead condition of both the rotary magnet and the solenoid valve, the magnet coils are energized for brief periods of time only which makes for low current consumption. The electrically operated switch members are obviously also suitable for program control.

Figure 6:
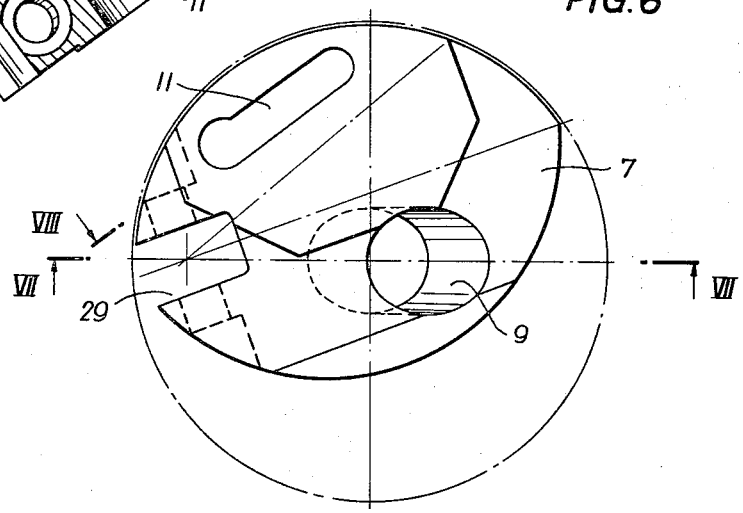
Figure 7:
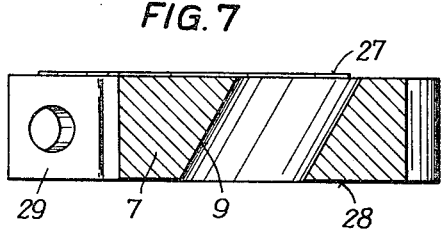

Further details of the invention will appear from the following description of an embodiment of the invention with reference to the accompanying drawing in which:

FIGS. 1 and 2 are diagrammatic sectional views of an embodiment of the invention in two different switch positions, FIGS. 1a and 2a the oscillograms associated with the switch positions shown in FIGS. 1 and 2 respectively, FIG. 3 is an axial cross-sectional view of the transducer housing with the changeover switch incorporated therein according to a variant of the embodiment of the invention, FIG. 4 a plan view of the housing shown in FIG. 3, FIG. 5 another axial cross-sectional view of the housing taken on line V—V of FIG. 4, FIG. 6 a plan view of the sliding switch and FIGS. 7 and 8 sectional views of the sliding switch shown in FIG. 6 taken on lines VII—VII and VIII—VIII respectively.

The pressure metering device comprises an adapter 1 receiving a preferably piezoelectric transducer 3 in an eccentrically arranged receiving bore 2. At the front end of the adapter 1 facing the transducer 3 a connector socket 4 with its flange 5 is tightly secured. The adapter 1 and the connector socket 4 together define a chamber 6 in which a sliding switch 7 is located, the said sliding switch being capable of a limited tilting motion about an axis extending in parallel relation to the axis of the adapter 1.

The sliding switch 7 presents parallel flat front surfaces 27 and 28 between which an oblique overflow channel 9 extends. In addition, an open transverse groove 11 is provided on the front surface 27 facing the transducer 3. In the position of the sliding switch 7 illustrated in FIG. 1, the space in front of the transducer 3 communicates via a connecting passage 8 and the overflow channel 9 with the receiving bore 10 of the adapter 1 (FIG. 1). Thus the transducer 3 is impinged upon in this switch position by the measuring pressure initiated via the receiving bore 10 when the adapter 1 is tightly connected with the measuring point, for example by screwing the connector socket 4 into the cylinder.

In the proximity of the receiving bore 2 of the transducer 3 a delivery pipe 12 is provided which terminates in the chamber 6. In the second switch position of the sliding switch 7 shown in FIG. 2, this delivery pipe 12 communicates via the overflow groove 11 of the slide and the connecting passage 8 with the space in front of the transducer 3. Consequently, the transducer 3 can be impinged upon in this switch position via the delivery pipe 12 by any desired reference pressure. For that purpose, the delivery pipe 12 is connectable with the atmosphere via a three-way solenoid valve 17 located in a valve housing 18, in the one switch position of the value via a breather pipe 20 or in the other switch position of the valve via a pressure connecting pipe 21 with an adjustable source of pressure. The three-way solenoid valve 17 actuated by means of a switch 19 maintains communication between the delivery pipe 12 and the atmosphere when out of circuit, that is with the switch 19 open (FIGS. 1 and 2). When the three-way solenoid valve 17 is energized (switch 19 closed), communication between the delivery pipe 12 and the source of pressure supplying the predetermined reference pressure is under control. The value housing 18 is provided with branch lines 22 to be closed by means of shutting plugs, the said branch lines serving as connections for additional adapters 1 of multi-cylinder internal combustion engines.

The switching motion of the sliding switch 7 is initiated by a rotary magnet 15 energized by means of a switch 16 via a control shaft 14 whose extremity protruding into the chamber 6 is designed as a carrier plate 13 engaging a lateral parallel-surfaced recess 29 of the sliding switch 7. When the rotary magnet 15 is out of circuit (switch 16 open), the sliding switch 7 occupies the switch position shown in FIG. 1, in which the transducer 3 is impinged upon by the pressure to be measured. When the rotary magnet 15 is in circuit, the sliding switch 7 occupies the second switch position (FIG. 2) in which the transducer 3 is impinged upon by the reference or atmospheric pressure.

Thus the solid pressure curve 24 appears on the screen of the oscillograph in the first switch position (FIG. 1a). In the second switch position (FIG. 2a), the atmospheric line 25 depending upon the position of the three-way valve 17 becomes visible. If the three-way valve 17 were switched over, the dotted reference pressure line 26 would appear on the screen. The atmospheric and/or reference pressure lines are preferably gated automatically by means of a central control unit by alternatingly operating switches 16 and 19.

The type of adapter shown in FIGS. 3 to 8 is provided with an additional equipment particularly suitable for low-pressure measurements. The same comprises a disk-shaped copper gasket 20 inserted in the receiving bore 2 and having a plurality of through bores 31. The copper gasket 30 fills the vacant space between the transducer 3 and the connecting passage 8. The receiving bore 10 of the connector socket 4 has a portion broadening in the direction of the chamber 6 and accommodating a cylindrical insert 32 with flange 33 upon which the sliding switch 7 rests with its lower front surface 28. The insert 32 rests with the opposite annular surface of its flange 33 upon a spring element comprising six superimposed annular plate-type compression springs 34 which is in turn supported by an annular insert 35 resting on a flexible gasket 36 inserted in a tapered portion of the receiving bore 10. Like the copper gasket 30, the cylindrical insert 32 is provided with a plurality of parallel through bores 37. This design provides for very small pressurized spaces in the area of the adapter, as is particularly convenient for low-pressure measurements.

When using this device for measurements within the low-pressure range it is furthermore advisable to insert an elastic intermediate member between the adapter 1 and the indicator bore in the cylinder in order to prevent sounds conducted through solids from interfering with the measurements. At the same time, the said intermediate member may comprise an automatically operated relief valve jet by means of which objectional pressure peaks are kept away from the transducer 3.

We claim:

1. A pressure metering device comprising a housing having a receiving bore enclosing a piezoelectric transducer, a sliding switch located in a chamber of the said housing and adjustable for two different switch positions, a connecting passage extending from the said chamber and terminating in the said transducer, a connector socket secured to the said housing and having a bore, one end of which terminates in the said chamber, the other end being open towards the measuring point, a delivery pipe terminating in the said chamber adjacent and in spaced relation to the said connecting passage, a three-way valve communicating with the other end of the said delivery pipe, a breather pipe originating with the said three-way valve and open towards the atmosphere, a pressure connecting line originating with the said three-way valve and communicating with a source of pressure supplying an adjustable reference pressure, the said sliding switch connecting in its first switch position the said connecting passage with the bore of the said connector socket and being open towards the pressure measuring point, and in its second switch position connecting the said connecting passage with the said delivery pipe.

2. A pressure metering device as claimed in claim 1, the said sliding switch having parallel front surfaces and a through overflow channel extending between the parallel front surfaces and open in the first switch position of the sliding switch both toward the said connecting passage and the said bore of the connecting socket, the said sliding switch also comprising a transverse open groove on the front surface facing the said transducer, the said groove registering in the second switch position both with the said connecting passage and with the said delivery pipe.

3. A pressure metering device as claimed in claim 1, wherein means are provided for the remote control of the said sliding switch and of the said three-way valve.

4. A pressure metering device as claimed in claim 3, wherein the said means for remote control comprises a rotary magnet drivingly connected with the said sliding switch, the position of the rotary magnet when out of circuit corresponding with the said first switch position of the sliding switch, and a solenoid valve forming the said three-way valve and when out of circuit connecting the said delivery pipe with the said breather pipe.

5. A pressure metering device as claimed in claim 4, wherein a control unit is provided for the operation of both the said rotary magnet and the said solenoid valve.

References Cited

UNITED STATES PATENTS 3,326,046   6/1967   Risher _____ 73—420 XR

S. CLEMENT SWISHER, *Acting Primary Examiner.*

DONALD O. WOODIEL, *Assistant Examiner.*